(12) United States Patent
Onishi et al.

(10) Patent No.: US 8,160,654 B2
(45) Date of Patent: Apr. 17, 2012

(54) POWER RECEPTION CONTROL DEVICE, POWER RECEPTION DEVICE, AND ELECTRONIC INSTRUMENT

(75) Inventors: Kota Onishi, Nagoya (JP); Kentaro Yoda, Chino (JP); Takahiro Kamijo, Nagano-ken (JP); Haruhiko Sogabe, Chino (JP); Kuniharu Suzuki, Tokyo (JP); Hiroshi Kato, Yokohama (JP); Katsuya Suzuki, Takasaki (JP); Manabu Yamazaki, Hiratsuka (JP)

(73) Assignees: Seiko Epson Corporation, Tokyo (JP); Sony Ericsson Mobile Communications Japan, Inc., Tokyo (JP)

( * ) Notice: Subject to any disclaimer, the term of this patent is extended or adjusted under 35 U.S.C. 154(b) by 783 days.

(21) Appl. No.: 12/007,671

(22) Filed: Jan. 14, 2008

(65) Prior Publication Data
US 2008/0169706 A1 Jul. 17, 2008

(30) Foreign Application Priority Data
Jan. 17, 2007 (JP) ................. 2007-007996

(51) Int. Cl.
*H04B 1/38* (2006.01)
(52) U.S. Cl. ............ 455/572; 455/127.1; 455/117; 455/573; 455/574
(58) Field of Classification Search ............ 455/127.1, 455/117, 572, 573, 574
See application file for complete search history.

(56) References Cited

U.S. PATENT DOCUMENTS

| 5,387,857 | A | * | 2/1995 | Honda et al. | 320/120 |
| 5,940,447 | A | * | 8/1999 | Connell et al. | 375/316 |
| 6,721,540 | B1 | * | 4/2004 | Hayakawa | 455/41.1 |
| 7,450,910 | B2 | * | 11/2008 | Aoki | 455/69 |
| 2004/0082369 | A1 | * | 4/2004 | Dayan et al. | 455/573 |
| 2005/0068019 | A1 | * | 3/2005 | Nakamura et al. | 323/355 |
| 2008/0009248 | A1 | * | 1/2008 | Rozenblit et al. | 455/127.1 |

FOREIGN PATENT DOCUMENTS
JP A-10-225020 8/1998
* cited by examiner

*Primary Examiner* — Kamran Afshar
*Assistant Examiner* — Sayed T Zewari
(74) *Attorney, Agent, or Firm* — Oliff & Berridge, PLC

(57) ABSTRACT

A power reception device utilizing non-contact power transmission causes a PMOS transistor as a switch circuit to be turned ON when a secondary battery is in a heavy-load state to form a path which bypasses a series regulator (LDO) as a power supply circuit, and supplies a charging current to the secondary battery through the bypass path. An offset may be provided between ON/OFF control threshold values of the PMOS transistor. The series regulator (LDO) may be entirely or partially set in a non-operating state when forming the bypass path.

15 Claims, 9 Drawing Sheets

POWER RECEPTION CONTROL DEVICE, POWER RECEPTION DEVICE, AND ELECTRONIC INSTRUMENT

Japanese Patent Application No. 2007-7996 filed on Jan. 17, 2007, is hereby incorporated by reference in its entirety.

BACKGROUND OF THE INVENTION

The present invention relates to a power reception control device, a power reception device, an electronic instrument, and the like.

In recent years, non-contact power transmission (contactless power transmission) which utilizes electromagnetic induction to enable power transmission without metal-to-metal contact has attracted attention. As application examples of non-contact power transmission, charging a portable telephone, a household appliance (e.g., telephone handset), and the like has been proposed.

JP-A-10-225020 discloses a non-contact power transmission device, for example. The technology disclosed in JP-A-10-225020 aims at providing a small non-contact power supply device which can supply power to a plurality of loads, and utilizes a plurality of induction coils.

According to the technology disclosed in JP-A-10-225020, an induction coil and a rectifier circuit are provided in a portable electronic instrument which receives power, and a secondary battery (e.g., lithium-ion battery) is charged using the output voltage of the rectifier circuit.

In recent years, a secondary battery such as a lithium-ion battery or a lithium polymer battery has been widely utilized as a battery for a portable terminal such as a portable telephone or a notebook type personal computer. A secondary battery such as a lithium-ion battery or a lithium polymer battery has an advantage in that the energy density is extremely high as compared with other batteries. On the other hand, since a secondary battery requires strict charge control taking deterioration and safety into consideration, highly accurate charge management technology is necessary.

Therefore, it is preferable to charge a secondary battery using a charging circuit utilizing a regulator (e.g., series regulator) which enables highly accurate output control.

It is desirable that the charging time of a secondary battery be short taking convenience to the user of a portable terminal into consideration. However, the charging efficiency of a secondary battery when using non-contact power transmission is lower than the charging efficiency when using a normal charger (charger using an AC adaptor) so that the charging time tends to increase. Therefore, when charging a portable terminal using non-contact power transmission, it is important to reduce power loss during charging as much as possible.

The inventors of the invention has found that power loss of the regulator occurs when it is necessary to cause a large amount of charging current to flow (e.g., when charging a secondary battery which has been exhausted to a large extent). This may hinder a reduction in charging time. It is also desirable to minimize heat generation of the regulator during charging taking the safety of a portable terminal into consideration.

SUMMARY

Some aspects of the invention may effectively reduce power loss and heat generation of a power reception device (device which receives power) utilizing non-contact power transmission technology by a simple configuration.

According to one aspect of the invention, there is provided a power reception control device provided in a power reception device of a non-contact power transmission system, the non-contact power transmission system transmitting power from a power transmission device to the power reception device that includes a rectifier circuit and a regulator by electromagnetically coupling a primary coil and a secondary coil, the non-contact power transmission system transmitting the power to a load from a voltage output node of the power reception device, the power reception control device comprising:

a power reception control circuit that monitors at least one of a voltage at an input terminal and a voltage at an output terminal of the regulator provided in the power reception device, and, when a capability of supplying power to the load has decreased due to a decrease in at least one of the voltage at the input terminal and the voltage at the output terminal, the power reception control circuit causing a switch circuit provided between the input terminal and the output terminal of the regulator to be turned ON to form a bypass path that directly connects the input terminal and the output terminal of the regulator.

According to another aspect of the invention, there is provided a power reception device comprising:

the above power reception control device;

a power reception section that includes the rectifier circuit and converts an induced voltage in the secondary coil into a direct-current voltage; and a power supply control section that includes the regulator and the switch circuit that is provided between the input terminal and the output terminal of the regulator, and controls power supply to the load.

According to another aspect of the invention, there is provided an electronic instrument comprising:

the above power reception device; and a load, power being supplied to the load from the power reception device.

BRIEF DESCRIPTION OF THE SEVERAL VIEWS OF THE DRAWING

FIG. 1A is a view showing examples of an electronic instrument to which non-contact power transmission is applied. FIG. 1B is a view illustrative of the principle of non-contact power transmission using an induction transformer.

FIG. 6A is a view showing a circuit configuration when monitoring the voltage at the input terminal of an LDO, and FIG. 6B is a view showing a circuit configuration when monitoring the voltages at the input terminal and the output terminal of the LDO.

Figure 1A:
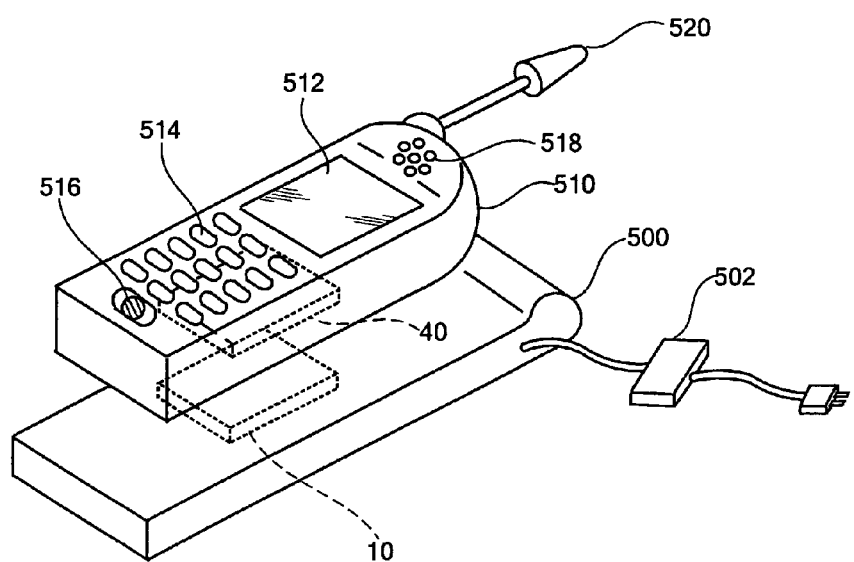
FIGS. 1A and 1B are views illustrative of non-contact power transmission technology.

DETAILED DESCRIPTION OF THE EMBODIMENT (1) According to one embodiment of the invention, there is provided a power reception control device provided in a power reception device of a non-contact power transmission system, the non-contact power transmission system transmitting power from a power transmission device to the power reception device that includes a rectifier circuit and a regulator by electromagnetically coupling a primary coil and a secondary coil, the non-contact power transmission system transmitting the power to a load from a voltage output node of the power reception device, the power reception control device comprising:

a power reception control circuit that monitors at least one of a voltage at an input terminal and a voltage at an output terminal of the regulator provided in the power reception device, and, when a capability of supplying power to the load has decreased due to a decrease in at least one of the voltage at the input terminal and the voltage at the output terminal, the power reception control circuit causing a switch circuit provided between the input terminal and the output terminal of the regulator to be turned ON to form a bypass path that directly connects the input terminal and the output terminal of the regulator.

The switch circuit is turned ON to form a low-loss bypass path when the capability of supplying power to the load has decreased due to a decrease in the voltage at the input terminal (or output terminal) of the regulator, and a current is supplied to the load through the bypass path. This enables the capability of supplying power to the load to be increased reasonably. Moreover, heat generation of the regulator when supplying a large amount of current to the load (i.e., under heavy load) can be suppressed. One of the main functions of the regulator as the power supply circuit is to limit the amplitude of a voltage when a voltage that exceeds the rated value is input. Since the bypass path is formed only when the voltage at the input terminal (or output terminal) of the regulator has decreased, an excessive voltage is not applied to the load. Therefore, a problem does not occur when bypassing the regulator.

(2) In the power reception control device,
the regulator may be a series regulator that functions as a power supply circuit; and the load may include a secondary battery.

A series regulator is a continuous-current constant voltage direct-current power supply circuit which includes a voltage control element connected in series with a load and can only decrease voltage. A series regulator produces a small amount of power supply ripple or noise, is highly stable, and has a small circuit area as compared with a switching control power supply. Therefore, a low-noise and low-loss series regulator such as the LDO (low dropout regulator) can be suitably provided in a small power reception device. A secondary battery can be charged if a voltage higher than the battery voltage to only a small extent is supplied. Therefore, a problem does not occur when supplying a current through the path which bypasses the regulator. Moreover, if a voltage which has not decreased (i.e., input voltage) is supplied through the path which bypasses the regulator (i.e., a large amount of current is supplied through the low-impedance bypass path), the charging time can be reduced correspondingly. It is important to suppress an increase in the charging time of the secondary battery used for a portable terminal or the like from the viewpoint of convenience to the user. According to this embodiment, the charging time of the secondary battery can be reasonably reduced by a simple configuration in which the regulator is bypassed using the low-loss switch circuit.

(3) In the power reception control device,
the power reception control circuit may cause the switch circuit to be turned ON or OFF based on the voltage at the input terminal of the regulator.

The switch circuit is ON/OFF-controlled (whether or not the regulator is bypassed is determined) based on the voltage at the input terminal of the regulator. Since the regulator can be bypassed after checking that the input voltage of the regulator has decreased to a value below the rated value, a situation in which the bypass path is erroneously formed when the input voltage is sufficiently high can be reliably prevented. When the input voltage of the regulator has decreased, the output voltage of the regulator has necessarily decreased. Therefore, the switch circuit can be appropriately ON/OFF-controlled even if only the voltage at the input terminal of the regulator is monitored. This method also has an advantage in that only one voltage monitor path is necessary.

(4) In the power reception control device,
the power reception control circuit may cause the switch circuit to be turned ON or OFF based on the voltage at the output terminal of the regulator.

The switch circuit is ON/OFF-controlled (whether or not the regulator is bypassed is determined) based on the voltage at the output terminal of the regulator. Since the switch circuit is ON/OFF-controlled based on the output voltage (voltage supplied to the load) of the regulator, the switch circuit can be accurately ON/OFF-controlled. When the output voltage of the regulator has decreased, the input voltage of the regulator has necessarily decreased. Therefore, even if only the voltage at the output terminal of the regulator is monitored, the bypass path is not formed in a state in which the input voltage is high. Moreover, the switch circuit can be turned OFF (i.e., path which bypasses the regulator can be disconnected) after checking that the output voltage (voltage supplied to the load) of the regulator has sufficiently recovered (risen). Therefore, the switch circuit can be appropriately OFF-controlled. This method also has an advantage in that only one voltage monitor path is necessary. Specifically, reliability is increased by directly monitoring the output voltage (voltage supplied to the load) of the regulator.

(5) In the power reception control device,
the power reception control circuit may cause the switch circuit to be turned ON based on the voltage at the input terminal of the regulator, and may cause the switch circuit to be turned OFF based on the voltage at the input terminal of the regulator.

The switch circuit is ON/OFF-controlled (whether or not the regulator is bypassed is determined) based on the voltage at the input terminal and the voltage at the output terminal of the regulator. Since the switch circuit is turned ON (i.e., the regulator is bypassed) after checking that the input voltage of the regulator has decreased to a value below the rated value, a situation in which the bypass path is erroneously formed when the input voltage is sufficiently high can be reliably prevented. Moreover, the switch circuit can be turned OFF (i.e., path which bypasses the regulator can be disconnected) after checking that the output voltage (voltage supplied to the load) of the regulator has sufficiently recovered (risen). Therefore, the switch circuit can be accurately OFF-controlled.

(6) In the power reception control device, a second threshold voltage that causes the switch circuit to be turned OFF may be set to be higher than a first threshold voltage that causes the switch circuit to be turned ON.

An offset is provided between the ON/OFF threshold values so that the switch circuit is ON/OFF-controlled with hysteresis characteristics. This prevents malfunction in which the switch circuit is repeatedly turned ON/OFF following a small change in the voltage at the input terminal or the output terminal of the regulator, whereby stable regulator bypass control is implemented. Specifically, the switch circuit can be turned ON when the voltage supplied to the load has become sufficiently lower than a normal value so that the regulator can be bypassed, and the switch circuit can be turned OFF when the voltage supplied to the load has fallen within a normal range and has sufficiently recovered (risen) so that the path which bypasses the regulator can be disconnected, for example. Therefore, stable and appropriate regulator bypass control is implemented.

In the power reception control device, the power reception control device may further include a switch control signal generation circuit that generates a switch control signal that causes the switch circuit to be turned ON/OFF, the switch control signal generation circuit including:

a first voltage divider resistor, a second voltage divider resistor, and a third voltage divider resistor that divide the voltage at the output terminal of the regulator;

a first hysteresis comparator, a voltage at a common connection point of the first voltage divider resistor and the second voltage divider resistor being applied to an inverting terminal of the first hysteresis comparator, and a reference voltage being applied to a non-inverting terminal of the first hysteresis comparator;

a second hysteresis comparator, a voltage at a common connection point of the second voltage divider resistor and the third voltage divider resistor being applied to an inverting terminal an output voltage of the second hysteresis comparator, and the reference voltage being applied to a non-inverting terminal of the second hysteresis comparator; and an RS flip-flop that is set based on a positive edge or a negative edge of an output voltage of the first hysteresis comparator, is reset based on a positive edge or a negative edge of an output voltage of the second hysteresis comparator, and outputs the switch control signal from its output terminal.

The above statement provides an example of a specific circuit configuration which provides the switch circuit ON/OFF control characteristics with hysteresis characteristics. Specifically, the switch control signal generation circuit that generates the switch control signal that causes the switch circuit to be turned ON/OFF includes a plurality of voltage divider resistors, at least two hysteresis comparators, and the RS flip-flop. This circuit has a simple configuration and is easily designed.

(8) In the power reception control device, the power reception control circuit may cause the switch circuit to be turned ON to form the bypass path while setting the entirety or part of the regulator in a non-operating state.

Even if the regulator is bypassed, the regulator consumes power and produces heat when the regulator operates, whereby loss of the received power occurs. Therefore, unnecessary power consumption and heat generation are suppressed by suspending the operation of the regulator when bypassing the regulator by causing the switch circuit to be turned ON, whereby loss of the received power is minimized. When suspending the operations of all elements of the regulator, the power consumption and heat generation of the regulator can be eliminated. However, when the operation of the regulator is adversely affected by setting all of the elements of the regulator (e.g., when a delay occurs when causing the regulator to operate), only some of the elements which affect the operation of the regulator to only a small extent may be set in a non-operating state. This also reduces the power consumption and heat generation of the regulator. According to this embodiment, the capability of the power reception device using non-contact power transmission to supply power to the load can be effectively improved while minimizing loss of the received power. Moreover, a problem relating to heat generation of the regulator can be eliminated.

(9) In the power reception control device, the non-operating state/operating state of the entirety or part of the regulator may be controlled based on a switch control signal that causes the switch circuit to be turned ON/OFF.

The switch control signal which causes the switch circuit to be turned ON/OFF is utilized for setting the regulator to be entirely or partially in a non-operating state/operating state. Therefore, the ON/OFF state of the switch circuit and the non-operating state/operating state of the regulator can be controlled using the switch control signal. This simplifies the control circuit.

According to another embodiment of the invention, there is provided a power reception device comprising:

one of the above power reception control devices;

a power reception section that includes the rectifier circuit and converts an induced voltage in the secondary coil into a direct-current voltage; and a power supply control section that includes the regulator and the switch circuit that is provided between the input terminal and the output terminal of the regulator, and controls power supply to the load.

According to the embodiment, power loss and heat generation of a power reception device (device which receives power) using the non-contact power transmission technology can be effectively suppressed by a simple configuration. Therefore, a non-contact power transmission power reception device having excellent characteristics such as a reduced size, low loss, and low heat generation can be implemented. In non-contact power transmission, loss due to power transmission between the induction coils inevitably occurs. Therefore, the power reception device is required to efficiently supply power to the load without unnecessarily consuming the received power due to heat generation and the like. According to the invention, these requirements can be satisfied.

(11) In the power reception device, the power reception device may further include a bypass control circuit that is used to control the switch circuit to be turned ON/OFF, and the power reception control circuit may control the switch circuit to be turned ON/OFF by controlling an operation of the bypass control circuit.

The above statement specifies that the bypass control circuit causes the switch circuit to be turned ON/OFF for bypassing the regulator in the power reception device.

(12) In the power reception device, the switch circuit may include a PMOS transistor, a source and a drain of the PMOS transistor being respectively connected to the input terminal and the output terminal of the regulator; and the bypass control circuit may include:

an NMOS transistor, a source of the NMOS transistor being grounded and a drain of the NMOS transistor being connected to a gate of the PMOS transistor; and a pull-up resistor that is connected between the gate of the PMOS transistor and the input terminal of the regulator.

The above statement specifies that the switch circuit is formed using the PMOS transistor (low-loss insulated gate field effect transistor), and the bypass control circuit is formed using the NMOS transistor and the pull-up resistor. The pull-up resistor maintains the gate of the PMOS transistor as the switch circuit at the high level when the NMOS transistor of the bypass control circuit is turned OFF so that the PMOS transistor is reliably turned OFF. Since the gate of the PMOS transistor as the switch circuit is always connected to the input terminal of the regulator via the pull-up resistor, the gate potential of the PMOS transistor is stabilized. Therefore, the pull-up resistor has a function of preventing a situation in which the PMOS transistor is unnecessarily turned ON. In non-contact power transmission, the operation of each section of the secondary-side instrument (power reception device) tends to become unstable. Therefore, it is important to always stabilize the gate voltage of the PMOS transistor as the bypass element using the pull-up resistor. The conductivity types of the transistors may be reversed. According to the above circuit configuration, the regulator can be bypassed using a minimum number of elements (two MOS transistors and one pull-up resistor). The simple circuit configuration facilitates implementation. Moreover, since each MOS transistor operates at high speed, high-speed switching control is possible.

(13) According to another embodiment of the invention, there is provided an electronic instrument comprising:

one of the above power reception devices; and a load, power being supplied to the load from the power reception device.

In the embodiment, the type of electronic instrument which is provided with the non-contact power transmission power reception device is not limited. For example, the invention may be applied to various electronic instruments such as a watch, a cordless telephone, a shaver, an electric toothbrush, a wrist computer, a handy terminal, a portable information terminal, and a power-assisted bicycle. Examples of particularly suitable electronic instruments include a portable terminal (including a portable telephone terminal, PDA terminal, and portable personal computer terminal) and a watch. Since the power reception device according to the invention has a simple configuration and a reduced size, the power reception device can be incorporated in a portable terminal or the like. The charging time of a secondary battery provided in an electronic instrument can be reduced using the power reception device according to the invention due to low loss. Moreover, since the power reception device according to the invention exhibits reduced heat generation, the reliability of an electronic instrument increases from the viewpoint of safety.

(14) In the electronic instrument, the electronic instrument may be a portable terminal.

Since a large amount of charging current flows through a portable terminal (including portable telephone terminal, PDA terminal, and portable personal computer terminal) under heavy load, heat generation tends to occur to a large extent. Therefore, the features of the invention (i.e., low loss and low heat generation) can be sufficiently utilized for such a portable terminal.

According to some embodiments of the invention, power loss and heat generation of the power reception device (device which receives power) utilizing the non-contact power transmission technology can be effectively reduced by a simple configuration.

Preferred embodiments of the invention are described below with reference to the drawings.

Note that the embodiments described below do not in any way limit the scope of the invention defined by the claims laid out herein. Note that all elements of the embodiments described below should not necessarily be taken as essential requirements for the invention.

First Embodiment

Examples of an electronic instrument to which the invention is suitably applied and the principle of non-contact power transmission technology are described below.

Figure 1B:
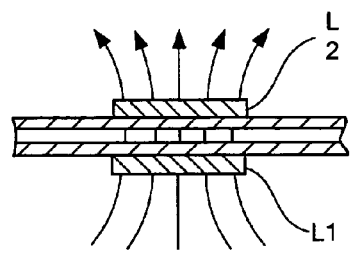

Examples of electronic instrument and principle of non-contact power transmission FIGS. 1A and 1B are views illustrative of non-contact power transmission technology. FIG. 1A is a view showing examples of an electronic instrument to which non-contact power transmission is applied. FIG. 1B is a view illustrative of the principle of non-contact power transmission using an induction transformer.

As shown in FIG. 1A, a charger 500 (cradle) (i.e., electronic instrument) includes a power transmission device 10. A portable telephone 510 (i.e., electronic instrument) includes a power reception device 40. The portable telephone 510 also includes a display section 512 such as an LCD, an operation section 514 which includes a button or the like, a microphone 516 (sound input section), a speaker 518 (sound output section), and an antenna 520.

Power is supplied to the charger 500 through an AC adaptor 502. The power supplied to the charger 500 is transmitted from the power transmission device 10 to the power reception device 40 by means of non-contact power transmission. This makes it possible to charge a battery of the portable telephone 510 or operate a device provided in the portable telephone 510.

Note that the electronic instrument to which this embodiment is applied is not limited to the portable telephone 510. For example, this embodiment may be applied to various electronic instruments such as a wristwatch, a cordless telephone, a shaver, an electric toothbrush, a wrist computer, a handy terminal, a portable information terminal, and a power-assisted bicycle.

Examples of a particularly suitable electronic instrument include a portable terminal (including a portable telephone terminal, PDA terminal, and portable personal computer terminal) and a watch. Since the power reception device according to the invention has a simple configuration and is small, the power reception device can be incorporated in a portable terminal or the like. The charging time of a secondary battery provided in an electronic instrument can be reduced using the power reception device according to the invention due to low loss. Moreover, since heat generation is reduced using the power reception device according to the invention, the reliability of an electronic instrument increases from the viewpoint of safety.

In particular, since a large amount of charging current flows through a portable terminal (including a portable telephone terminal, PDA terminal, and portable personal computer terminal) under heavy load, heat generation tends to occur to a large extent. Therefore, the features of the invention (i.e., low loss and low heat generation) can be sufficiently utilized for such a portable terminal.

As schematically shown in FIG. 1B, power transmission from the power transmission device 10 to the power reception device 40 is implemented by electromagnetically coupling a primary coil L1 (power-transmission-side coil) provided in the power transmission device 10 and a secondary coil L2 (power-receiving-side coil) provided in the power reception device 40 to form a power transmission transformer. This enables non-contact power transmission.

Configuration examples of power transmission device and power reception device

Figure 2:
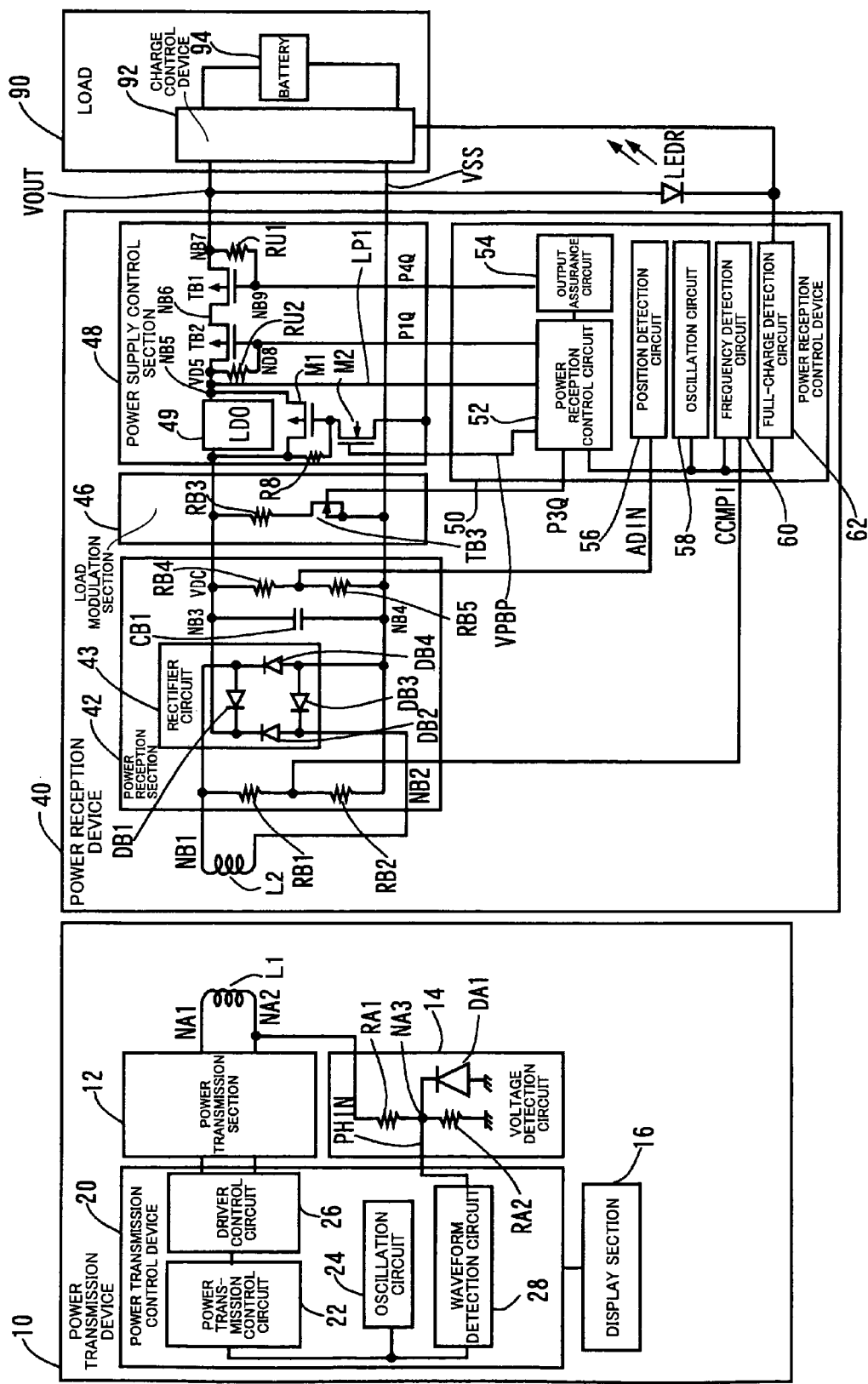
FIG. 2 is a circuit diagram showing an example of a specific configuration of each section of a non-contact power transmission system according to the invention which includes a power transmission device, a power reception device, and a load.

FIG. 2 is a circuit diagram showing an example of a specific configuration of each section of a non-contact power transmission system which includes a power transmission device, a power reception device, and a load. As shown in FIG. 2, the power transmission device 10 includes a power transmission control device 20 and a power transmission section 12. The power reception device 40 includes a power reception section 40, a load modulation section 46, and a power supply control section 48. A load 90 includes a charge control device 92 and a battery (secondary battery) 94. The details are given below.

A power-transmission-side electronic instrument such as the charger 500 shown in FIG. 1A includes at least the power transmission device 10 shown in FIG. 2. A power-reception-side electronic instrument such as the portable telephone 510 includes at least the power reception device 40 and the load 90 (actual load). The configuration shown in FIG. 2 implements a non-contact power transmission (contactless power transmission) system in which power is transmitted from the power transmission device 10 to the power reception device 40 by electromagnetically coupling the primary coil L1 and the secondary coil L2, and power (voltage VOUT) is supplied to the load 90 from a voltage output node NB7 of the power reception device 40.

The power transmission device 10 (power transmission module or primary module) may include the primary coil L1, a power transmission section 12, a voltage detection circuit 14, a display section 16, and a power transmission control device 20. The power transmission device 10 and the power transmission control device 20 are not limited to the configuration shown in FIG. 2. Various modifications may be made such as omitting some elements (e.g., display section and voltage detection circuit), adding other elements, or changing the connection relationship.

The power transmission section 12 generates an alternating-current voltage at a given frequency during power transmission, and generates an alternating-current voltage at a frequency which differs depending on data during data transfer. The power transmission section 12 supplies the generated alternating-current voltage to the primary coil L1. For example, the power transmission section 12 generates an alternating-current voltage at a frequency f1 when transmitting data "1" to the power reception device 40, and generates an alternating-current voltage at a frequency f2 when transmitting data "0" to the power reception device 40. The power transmission section 12 may include a first power transmission driver which drives one end of the primary coil L1, a second power transmission driver which drives the other end of the primary coil L1, and at least one capacitor which forms a resonant circuit together with the primary coil L1. Each of the first and second power transmission drivers included in the power transmission section 12 is an inverter circuit (or buffer circuit) which includes a power MOS transistor, for example, and is controlled by a driver control circuit 26 of the power transmission control device 20.

The primary coil L1 (power-transmission-side coil) is electromagnetically coupled with the secondary coil L2 (power-reception-side coil) to form a power transmission transformer. For example, when power transmission is necessary, the portable telephone 510 is placed on the charger 500 so that a magnetic flux of the primary coil L1 passes through the secondary coil L2, as shown in FIGS. 1A and 1B. When power transmission is unnecessary, the charger 500 and the portable telephone 510 are physically separated so that a magnetic flux of the primary coil L1 does not pass through the secondary coil L2.

As the primary coil L1 and the secondary coil L2, a planar coil formed by spirally winding an insulated wire in a single plane may be used, for example. A planar coil may also be used which is formed by spirally winding a twisted wire (wire obtained by twisting a plurality of insulated thin wires).

The voltage detection circuit 14 is a circuit which detects an induced voltage in the primary coil L1. The voltage detection circuit 14 includes resistors RA1 and RA2 and a diode DA1 provided between a connection node NA3 of the resistors RA1 and RA2 and a power supply GND (low-potential-side power supply in a broad sense), for example. Specifically, a signal PHIN obtained by dividing the induced voltage in the primary coil L1 using the resistors RA1 and RA2 is input to a waveform detection circuit 28 of the power transmission control device 20.

The display section 16 displays the state (e.g., power transmission or ID authentication) of the non-contact power transmission system using a color, an image, or the like. The display section 16 is implemented by a light-emitting diode (LED), a liquid crystal display (LCD), or the like.

The power transmission control device 20 controls the power transmission device 10. The power transmission control device 20 may be implemented by an integrated circuit device (IC) or the like. The power transmission control device 20 may include a (power-transmission-side) control circuit 22, an oscillation circuit 24, a driver control circuit 26, and the waveform detection circuit 28.

The control circuit 22 (control section) controls the power transmission device 10 and the power transmission control device 20. The control circuit 22 may be implemented by a gate array, a microcomputer, or the like. Specifically, the control circuit 22 performs sequence control and a determination process necessary for power transmission, load detection, frequency modulation, foreign object detection, detachment detection, and the like.

The oscillation circuit 24 includes a crystal oscillation circuit, for example. The oscillation circuit 24 generates a primary-side clock signal. The driver control circuit 26 generates a control signal at a desired frequency based on the clock signal generated by the oscillation circuit 24, a frequency setting signal from the control circuit 22, and the like, and outputs the generated control signal to the power transmission drivers (not shown) of the power transmission section 12 to control the operations of the power transmission drivers.

The waveform detection circuit 28 monitors the waveform of the signal PHIN which corresponds to the induced voltage at one end of the primary coil L1, and performs load detection, foreign object detection, and the like. For example, when a load modulation section 46 of the power reception device 40 performs load modulation for transmitting data to the power transmission device 10, the signal waveform of the induced voltage in the primary coil L1 changes correspondingly.

Specifically, the amplitude (peak voltage) of the signal waveform decreases when the load modulation section 46 reduces load in order to transmit data "0", and increases when the load modulation section 46 increases load in order to transmit data "1". Therefore, the waveform detection circuit 28 can determine whether the data transmitted from the power reception device 40 is "0" or "1" by determining whether or not the peak voltage has exceeded a threshold voltage by performing a peak-hold process on the signal waveform of the induced voltage, for example. Note that the waveform detection method is not limited to the above-described method. For example, the waveform detection circuit 28 may determine whether the power-reception-side load has increased or decreased using a physical quantity other than the peak voltage.

The power reception device 40 (power reception module or secondary module) may include the secondary coil L2, a power reception section 42, the load modulation section 46, a power supply control section 48, and a power reception control device 50. The power reception device 40 and the power reception control device 50 are not limited to the configuration shown in FIG. 2. Various modifications may be made such as omitting some elements, adding other elements, or changing the connection relationship.

The power reception section 42 converts an alternating-current induced voltage in the secondary coil L2 into a direct-current voltage. A rectifier circuit 43 included in the power reception section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node). The diode DB2 is provided between the node NB3 and a node NB2 at the other end of the secondary coil L2. The diode DB3 is provided between the node NB2 and a node NB4 (VSS). The diode DB4 is provided between the nodes NB4 and NB1.

Resistors RB1 and RB2 of the power reception section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power reception section 42 are provided between the node NB3 (direct-current voltage VDC) and the node NB4 (VSS). A signal ADIN obtained by dividing the voltage between the nodes NB3 and NB4 using the resistors RB4 and RB5 is input to a position detection circuit 56 of the power reception control device 50.

The load modulation section 46 performs load modulation. Specifically, when the power reception device 40 transmits desired data to the power transmission device 10, the load modulation section 46 variably changes the load of the load modulation section 46 (secondary side) depending on the transmission data to change the signal waveform of the induced voltage in the primary coil L1. The load modulation section 46 includes a resistor RB3 and a transistor TB3 (N-type CMOS transistor) provided in series between the nodes NB3 and NB4.

The transistor TB3 is ON/OFF-controlled based on a signal P3Q from a control circuit 52 of the power reception control device 50. When the load modulation section 46 performs load modulation by ON/OFF-controlling the transistor TB3, transistors TB1 and TB2 of the power supply control section 48 are turned OFF so that the load 90 is electrically disconnected from the power reception device 40.

For example, when reducing the secondary-side load (high impedance) in order to transmit data "0", the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 becomes the resistor RB3 (high load).

The power supply control section 48 controls power supply to the load 90. A regulator (LDO) 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

An advantageous feature is that a switch circuit formed of a PMOS transistor (M1) is provided between the input terminal and the output terminal of the regulator (LDO) 49. A path which bypasses the regulator (LDO) 49 is formed by turning ON the PMOS transistor (M1) as the switch circuit. For example, since a power loss increases due to the equivalent impedance of the regulator 49 and heat generation increases under heavy load (e.g., when it is necessary to cause an almost constant large current to steadily flow in the initial stage of charging a secondary battery which has been exhausted to a large extent), a current is supplied to the load through the bypass path while avoiding the regulator.

An NMOS transistor (M2) and a pull-up resistor R8 which function as a bypass control circuit are provided in order to ON/OFF-control the PMOS transistor (M1) as the switch circuit. When the NMOS transistor (M2) is turned ON, the gate of the PMOS transistor (M1) is set at the low level, whereby the PMOS transistor (M1) is turned ON so that a path which bypasses the regulator (LDO) 49 is formed. When the NMOS transistor (M2) is turned OFF, the gate of the PMOS transistor (M1) is maintained at the high level through the pull-up resistor R8. Therefore, the PMOS transistor (M1) is turned OFF so that the bypass path is not formed.

The NMOS transistor (M2) is ON/OFF-controlled by the power reception control circuit 52 included in the power reception control device 50.

A transistor TB2 (P-type CMOS transistor) is provided between a power supply voltage (VD5) generation node NB5 (output node of the regulator 49) and a transistor TB1 (node NB6), and is controlled based on a signal P1Q from the control circuit 52 of the power reception control device 50. Specifically, the transistor TB2 is turned ON when ID authentication has been completed (established) and normal power transmission is performed, and is turned OFF during load modulation or the like. A pull-up resistor RU2 is provided between the power supply voltage generation node NB5 and a node NB8 of the gate of the transistor TB2.

The transistor TB1 (P-type CMOS transistor) is provided between the transistor TB2 (node NB6) and the voltage VOUT output node NB7, and is controlled based on a signal P4Q from an output assurance circuit 54. Specifically, the transistor TB1 is turned ON when ID authentication has been completed and normal power transmission is performed. The transistor TB1 is turned OFF when connection of an AC adaptor has been detected or the power supply voltage VD5 is lower than the operation lower limit voltage of the power reception control device 50 (control circuit 52), for example. A pull-up resistor RU1 is provided between the voltage output node NB7 and a node NB9 of the gate of the transistor TB1.

The power reception control device 50 controls the power reception device 40. The power reception control device 50 may be implemented by an integrated circuit device (IC) or the like. The power reception control device 50 may operate based on the power supply voltage VD5 generated from the induced voltage in the secondary coil L2. The power reception control device 50 may include the (power-reception-side) control circuit 52, the output assurance circuit 54, the position detection circuit 56, an oscillation circuit 58, the frequency detection circuit 60, and a full-charge detection circuit 62.

The control circuit 52 (control section) controls the power reception device 40 and the power reception control device 50. The control circuit 52 may be implemented by a gate array, a microcomputer, or the like. Specifically, the control circuit 22 performs sequence control and a determination process necessary for ID authentication, position detection, frequency detection, load modulation, full-charge detection, and the like.

The output assurance circuit 54 assures the output from the power reception device 40 when the voltage is low (0 V). Specifically, when connection of an AC adaptor has been detected or the power supply voltage VD5 is lower than the operation lower limit voltage, for example, the output assurance circuit 54 causes the transistor TB1 to be turned OFF to prevent a backward current flow from the voltage output node NB7 to the power reception device 40.

The position detection circuit 56 monitors the waveform of the signal ADIN which corresponds to the waveform of the induced voltage in the secondary coil L2, and determines whether or not the positional relationship between the primary coil L1 and the secondary coil L2 is appropriate. Specifically, the position detection circuit 56 converts the signal ADIN into a binary value using a comparator, and determines whether or not the positional relationship between the primary coil L1 and the secondary coil L2 is appropriate.

The oscillation circuit 58 includes a CR oscillation circuit, for example. The oscillation circuit 58 generates a secondary-side clock signal. The frequency detection circuit 60 detects the frequency (f1 or f2) of the signal CCMPI, and determines whether the data transmitted from the power transmission device 10 is "1" or "0".

The full-charge detection circuit 62 (charge detection circuit) detects whether or not the battery 94 of the load 90 has been fully charged (charged). Specifically, the full-charge detection circuit 62 detects the full-charge state by detecting whether a light-emitting device LEDR used to display the charge state is turned ON or OFF, for example. The full-charge detection circuit 62 determines that the battery 94 has been fully charged (charging has been completed) when the light-emitting device LEDR has been turned OFF for a given period of time (e.g., five seconds).

The load 90 includes the charge control device 92 which controls charging the battery 94 and the like. The charge control device 92 (charge control IC) may be implemented by an integrated circuit device or the like. The battery 94 may be provided with the function of the charge control device 92 (e.g., smart battery). Note that the load 90 is not limited to a secondary battery.

Regulator Bypass Control

A specific example of LDO (low dropout regulator) bypass control is described below with reference to FIGS. 3 to 7. The LDO is a saturation-type series regulator which can operate even when the voltage across the LDO is about 1 V, for example. A series regulator is a continuous-current constant voltage direct-current power supply circuit which includes a voltage control element connected in series with a load and can only decrease voltage. A series regulator produces a small amount of power supply ripple or noise, is highly stable, and has a small circuit area as compared with a switching control power supply. Therefore, a low-noise and low-loss series regulator such as the LDO (low dropout regulator) can be suitably provided in a small power reception device.

Figure 3:
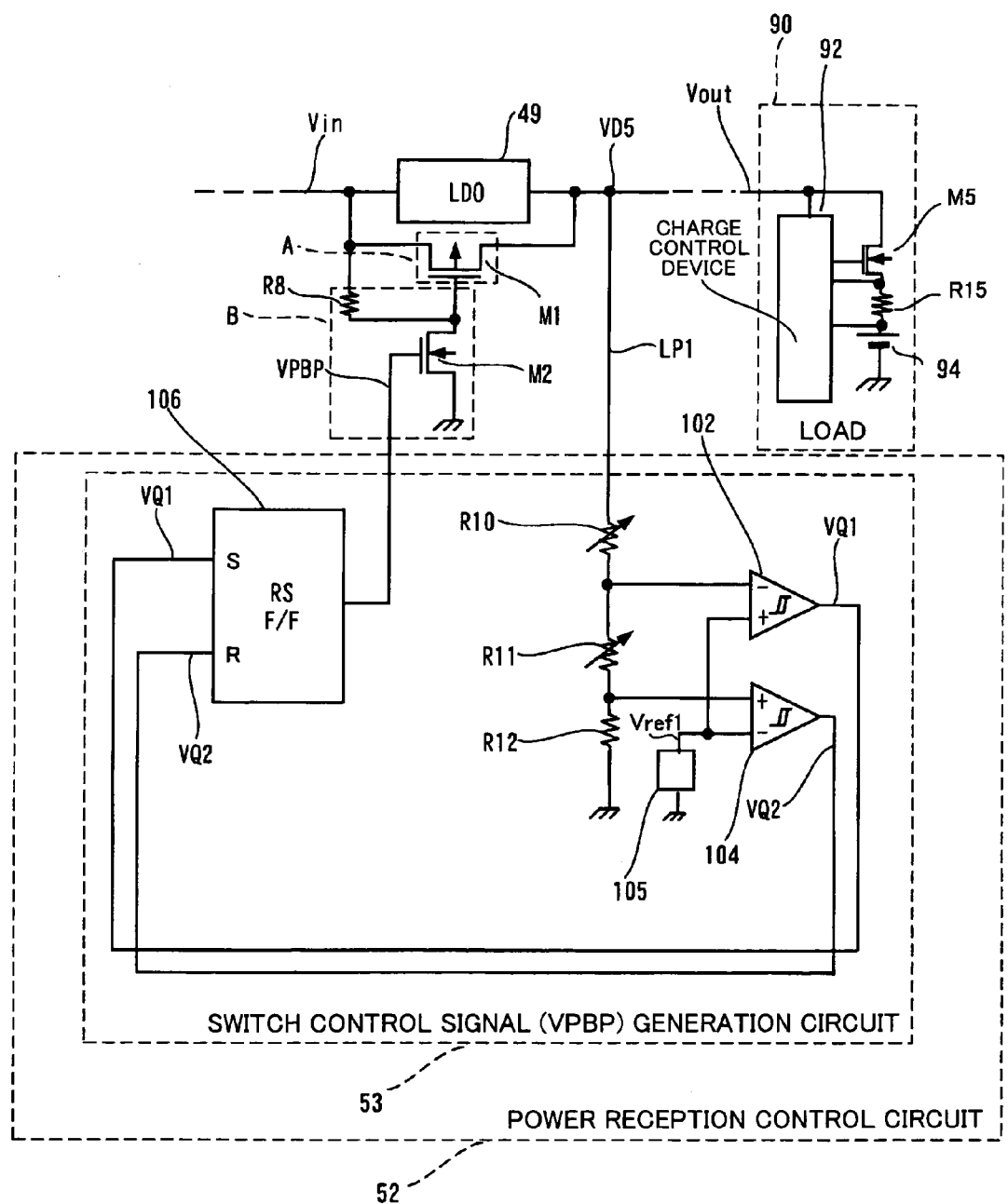
FIG. 3 is a circuit diagram showing an example of the configuration of a circuit (LDO peripheral circuit, power reception control circuit, and load) relating to regulator bypass control in a power reception device according to the invention.

FIG. 3 is a circuit diagram showing an example of the configuration of a circuit (LDO peripheral circuit, power reception control circuit, and load) relating to regulator bypass control.

The source and the drain of the PMOS transistor (M1) are connected to the input terminal and the output terminal of the LDO 49. The PMOS transistor (M1) forms a bypass switch circuit (A). It is desirable that the switch circuit (A) have a simple configuration. If necessary, the switch circuit (A) may have a circuit configuration using two or more elements.

When the PMOS transistor (M1) as the switch circuit (A) is turned ON, a path which bypasses the LDO 49 is formed. A charging current is supplied to the load 90 through the bypass path.

The switch circuit (A) is ON/OFF-controlled by a bypass control circuit (B). The bypass control circuit (B) includes the NMOS transistor (M2) of which the source is grounded, and the pull-up resistor (R8) of which one end is connected to the input terminal of the LDO 49 and the other end is connected to the drain of the NMOS transistor (M2).

The pull-up resistor (R8) maintains the gate of the PMOS transistor (M1) as the switch circuit (A) at the high level when the NMOS transistor (M2) of the bypass control circuit (B) is turned OFF so that the PMOS transistor (M1) is reliably turned OFF.

Since the gate of the PMOS transistor (M1) as the switch circuit (A) is always connected to the input terminal of the regulator (LDO) 49 via the pull-up resistor (R8), the gate potential of the PMOS transistor (M1) is stabilized. Therefore, the pull-up resistor (R8) has a function of preventing a situation in which the PMOS transistor (M1) is unnecessarily turned ON. In non-contact power transmission, the operation of each section of the secondary-side instrument (power reception device 40) tends to become unstable. Therefore, it is important to always stabilize the gate voltage of the PMOS transistor (M1) as the bypass element using the pull-up resistor (R8).

It is desirable that the bypass circuit (B) have a simple configuration. If necessary, the bypass circuit (B) may have another configuration.

The load 90 includes the secondary battery 94 such as a lithium-ion battery, the charge control circuit 92 which controls charging the secondary battery 94, a charge control transistor M5, and a detection resistor R15 for detecting a charging current. The output voltage (Vout) from the power supply control section 48 (see FIG. 2) is applied to the load 90.

The power reception control circuit 52 included in the power reception control device 50 (see FIG. 2) includes a circuit (switch control signal generation circuit) 53 which generates a bypass switch control signal (VPBP). The switch control signal generation circuit 53 always monitors the voltage (VD5) at the output terminal of the LDO 49 via a monitor line (LP1), and generates the switch control signal (VPBP) which causes the NMOS transistor (M2) of the bypass control circuit (B) to be turned ON/OFF based on the output voltage (VD5)).

According to the circuit shown in FIG. 3, since the switch circuit (A) is ON/OFF-controlled based on the output voltage (VD5: voltage supplied to the load 90) of the LDO 49, the switch circuit (A) can be accurately ON/OFF-controlled. When the output voltage (VD5) of the LDO 49 has decreased, the input voltage (Vin) of the LDO 49 has necessarily decreased. Therefore, even if only the voltage (VD5) at the output terminal of the LDO 49 is monitored, the bypass path is not formed in a state in which the input voltage (Vin) is high. It is also possible to cause the switch circuit (A) to be turned OFF (i.e., disconnect the path which bypasses the LDO 49) after checking that the output voltage (VD5: voltage supplied to the load) of the LDO 49 has sufficiently recovered (risen). This ensures an appropriate OFF control of the switch circuit (A). In addition, it suffices to provide only one voltage monitor path. Specifically, reliability is increased by directly monitoring the output voltage (VD5: voltage supplied to the load 90) of the LDO 49.

Note that the voltage at the input terminal (Vin) of the LDO 49 may be monitored instead of the voltage (VD5) at the output terminal, or the voltage at the input terminal (Vin) and the voltage (VD5) at the output terminal of the LDO 49 may be monitored (as described later with reference to FIG. 6).

The switch control signal generation circuit 53 included in the power reception control circuit 52 utilizes at least two threshold values for generating the switch control signal (VPBP). The switch control signal generation circuit 53 provides an offset between the threshold values, and ON/OFF-controls the switch circuit (A) with hysteresis characteristics.

Specifically, a threshold value (bypass OFF threshold value) at which the PMOS transistor (M1) is turned OFF is set to be higher than a threshold value (bypass ON threshold value) at which the PMOS transistor (M1) is turned ON to ON/OFF-control the switch circuit (A) with hysteresis characteristics. This prevents malfunction in which the switch circuit is repeatedly turned ON/OFF following a small change in the voltage at the output terminal of the LDO 49, whereby stable regulator bypass control is implemented.

Specifically, the switch circuit (A) can be turned ON when the voltage supplied to the load has become sufficiently lower than a normal value (e.g., when the voltage supplied to the load has decreased to 4.7 V or less when the rated value is 5.2 V) so that the LDO 49 can be bypassed, and the switch circuit (A) can be turned OFF when the voltage supplied to the load has fallen within a normal range and has sufficiently recovered (risen) (e.g., when the voltage supplied to the load has reached the rated value (5.2 V)) so that the path which bypasses the LDO 49 can be disconnected, for example. In this example, 4.7 V is a first threshold value at which the switch circuit (A) is turned ON, and 5.2 V is a second threshold value at which the switch circuit (A) is turned OFF (i.e., first threshold value<second threshold value). Stable and appropriate bypass control is implemented by ON/OFF-controlling the switch circuit (A) with hysteresis characteristics as described above.

Specifically, the power reception control circuit 52 includes first and second voltage comparators (102 and 104) with hysteresis characteristics, voltage divider resistors (R10 to R12: R10 and R11 are variable resistors), a reference voltage generation circuit 105, and an RS flip-flop (RS F/F) which latches output voltages (VQ1 and VQ2) of the first and second voltage comparators (102 and 104). The term "voltage comparator with hysteresis characteristics" is hereinafter referred to as "hysteresis comparator".

Specifically, the switch control signal generation circuit 53 includes first, second, and third voltage divider resistors (R10, R11, and R12) for dividing the voltage (VD5) at the output terminal of the LDO 49, a first hysteresis comparator (102) to which the voltage at a common connection point of the first and second voltage divider resistors (R10 and R11) is applied at an inverting terminal and a reference voltage (Vref1) is applied at a non-inverting terminal, a second hysteresis comparator (104) to which the voltage at a common connection point of the third and fourth voltage divider resistors (R11 and R12) is applied at an inverting terminal and the reference voltage (Vref1) is applied at a non-inverting terminal, and an RS flip-flop (106) which is set based on a positive edge or a negative edge of the output voltage of the first hysteresis comparator (102), is reset based on a positive edge or a negative edge of the second hysteresis comparator (104), and outputs the switch control signal (VPBP) from its output terminal. The switch control signal generation circuit 53 has a simple circuit configuration and is easily implemented.

Figure 4:
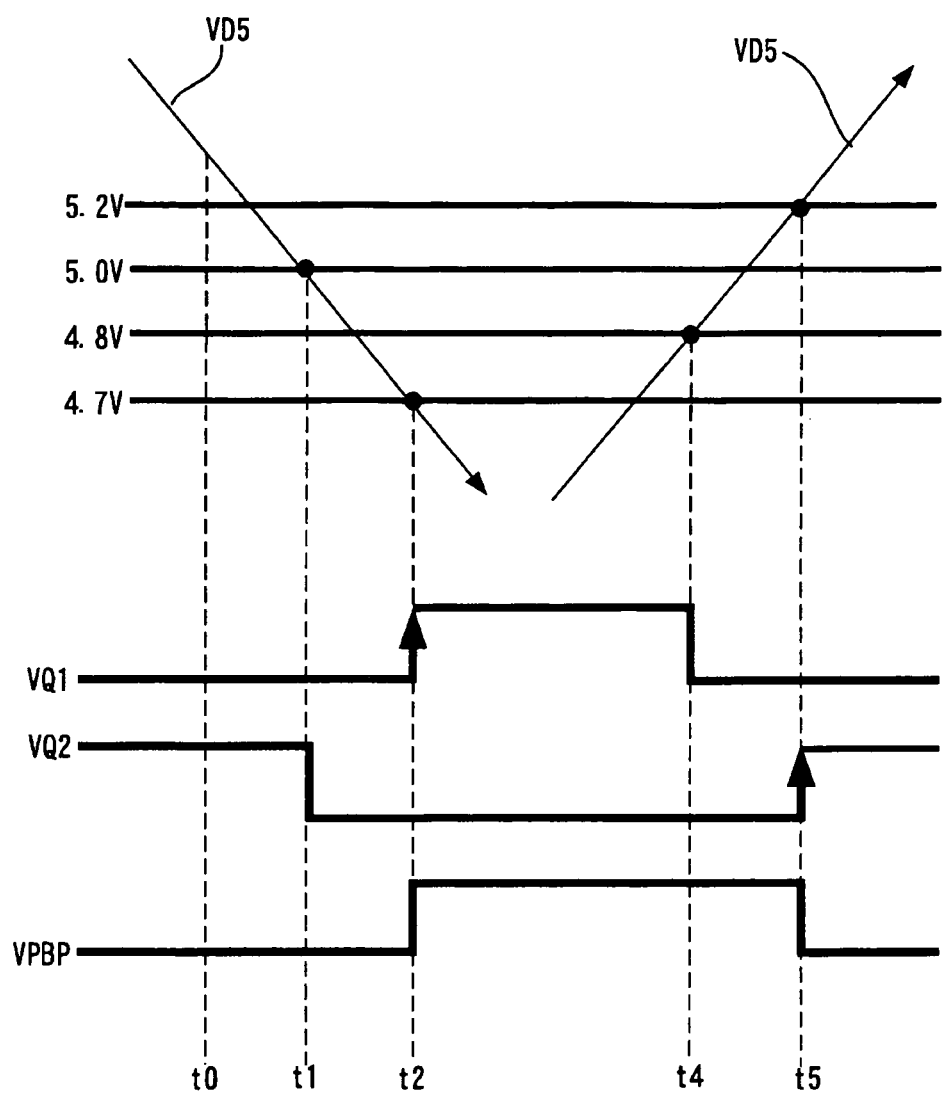
FIG. 4 is a timing diagram illustrative of ON/OFF control of a switch circuit with hysteresis characteristics performed by a power reception control circuit shown in FIG. 3.

FIG. 4 is a timing diagram illustrative of ON/OFF control of the switch circuit with hysteresis characteristics performed by the power reception control circuit shown in FIG. 3. In FIG. 4, the input voltage (VD5) of the LDO 49 successively decreases from time t0 to time t2, and then successively increases from time t4 to time t5.

The output voltage (VQ1) of the first voltage comparator (102) changes from the low level to the high level when the output voltage (VD5) of the LDO 49 has decreased to 4.7 V or less (time t2), and changes from the high level to the low level when the output voltage (VD5) of the LDO 49 has increased to 4.8 V or more (time t4). The output voltage (VQ2) of the second voltage comparator (104) changes from the high level to the low level when the output voltage (VD5) of the LDO 49 has decreased to 5.0 V or less (time t1), and changes from the low level to the high level when the output voltage (VD5) of the LDO 49 has increased to 5.2 V (rated value) or more (time t5).

The bypass switch control signal (VPBP) output from the flip-flop (F/F) 106 changes from the low level to the high level based on the positive edge of the output voltage (VQ1) as a trigger (time t1), and changes from the high level to the low level based on the positive edge of the output voltage (VQ2) as a trigger (time t5).

Figure 5:
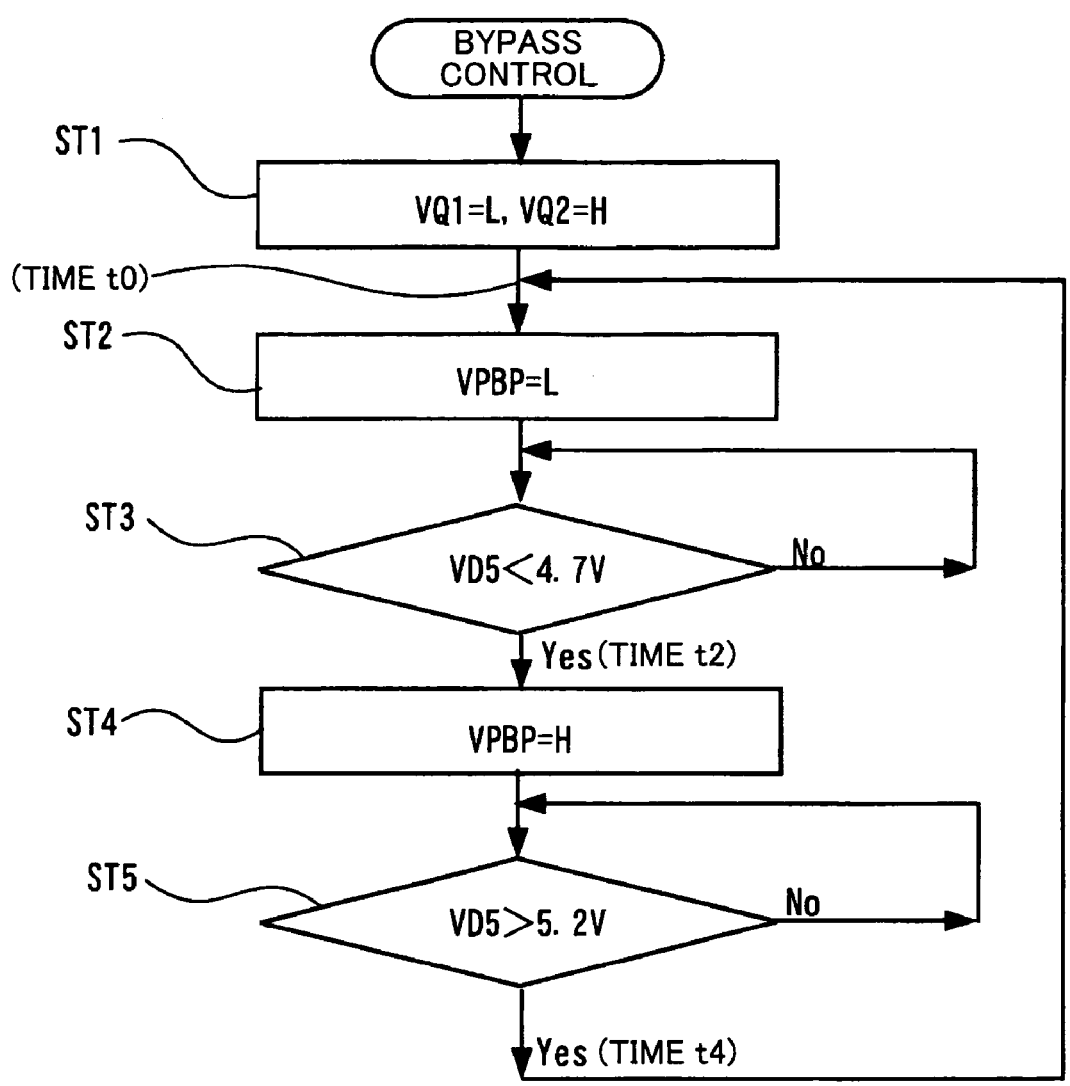
FIG. 5 is a flowchart showing an LDO bypass control process with hysteresis characteristics shown in FIG. 4.

FIG. 5 is a flowchart showing the LDO bypass control process with hysteresis characteristics shown in FIG. 4. The output voltages (VQ1 and VQ2) of the first and the second voltage comparators (102 and 104) are respectively set at L and H (step ST1, time t0 in FIG. 4). The bypass switch control signal (VPBP) is set at the L level in this state (step ST2).

When the voltage level of the output voltage (VD5) of the LDO 49 has decreased to 4.7 V or less (step ST3), the bypass switch control signal (VPBP) changes to the H level (step ST4, time t2 in FIG. 4). When the voltage level of the output voltage (VD5) of the LDO 49 has increased to 5.2 V or more (step ST5, time t4 in FIG. 4), the process returns to the step ST2 so that the bypass switch control signal (VPBP) changes to the H level.

According to the power reception control circuit 52 shown in FIG. 3, bypass control with hysteresis characteristics can be implemented by a simple configuration.

Figure 6A:
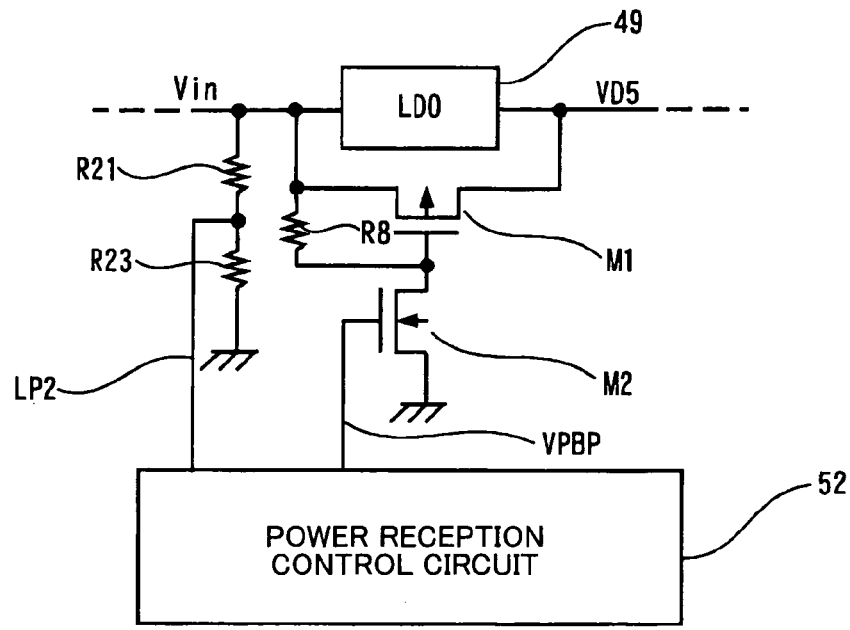
FIGS. 6A and 6B are views illustrative of variations of an LDO voltage monitoring method.
Figure 6B:
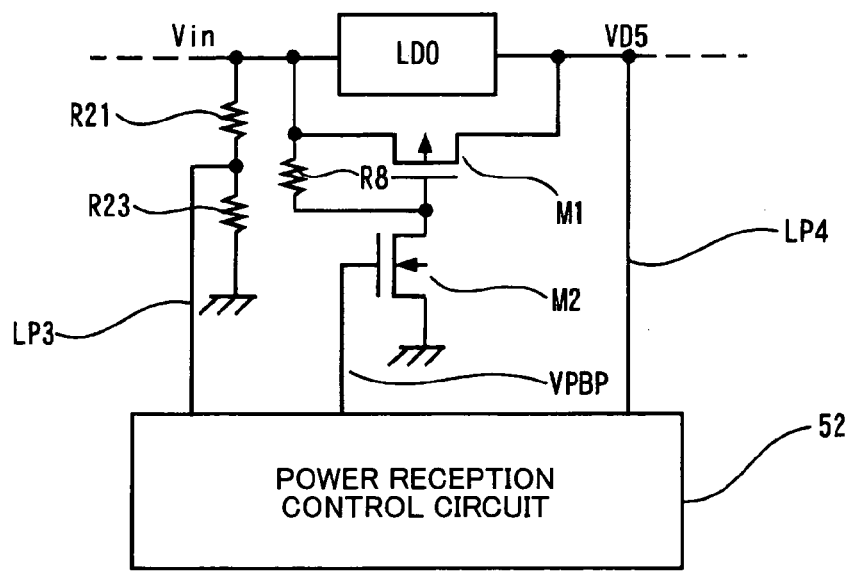

Variations when monitoring the voltage of the LDO 49 are described below. FIGS. 6A and 6B are views illustrative of variations of the LDO voltage monitoring method. FIG. 6A is a view showing a circuit configuration when monitoring the voltage at the input terminal of the LDO, and FIG. 6B is a view showing a circuit configuration when monitoring the voltages at the input terminal and the output terminal of the LDO.

In FIG. 6A, the PMOS transistor (M1) as the bypass switch circuit is ON/OFF-controlled based on the voltage (Vin) at the input terminal of the VDO 49. Specifically, the voltage (Vin) at the input terminal of the VDO 49 is divided using resistors R21 and R23, and the divided voltage is input to the power reception control circuit 52 via a monitor line LP2. The power reception control circuit 52 generates the bypass switch control signal (VPBP) using the circuit configuration shown in FIG. 3.

According to the circuit configuration shown in FIG. 6A, since the regulator can be bypassed after checking that the input voltage (Vin) has decreased to a value below the rated value, a situation in which the bypass path is erroneously formed when the input voltage (Vin) is sufficiently high can be reliably prevented. When the input voltage (Vin) of the LDO 49 has decreased, the output voltage (VD5) of the LDO 49 has necessarily decreased. Therefore, the PMOS transistor (M1) can be appropriately ON/OFF-controlled even if only the voltage (Vin) at the input terminal of the LDO 49 is monitored. This method also has an advantage in that only one voltage monitor path is necessary.

According to the circuit configuration shown in FIG. 6B, the voltage (Vin) at the input terminal and the voltage (VD5) at the output terminal of the LDO 49 are monitored via monitor lines LP3 and LP4, respectively. The PMOS transistor (M1) as the bypass switch circuit is ON-controlled based on the input voltage (Vin), and the PMOS transistor (M1) is OFF-controlled based on the output voltage (VD5).

Since the PMOS transistor (M1) is turned ON (i.e., the LDO 49 is bypassed) after checking that the input voltage (Vin) of the LDO 49 has decreased to a value (e.g., 4.7 V or less) sufficiently lower than the rated value, a situation in which the bypass path is erroneously formed when the input voltage is sufficiently high can be reliably prevented. Moreover, the PMOS transistor (M1) can be turned OFF (i.e., the path which bypasses the regulator can be disconnected) after checking that the output voltage (VD5: voltage supplied to the load) of the LDO 49 has sufficiently recovered (risen: has returned to the rated value (5.2 V), for example). Therefore, the PMOS transistor (M1) as the bypass switch circuit can be accurately OFF-controlled.

Figure 7:
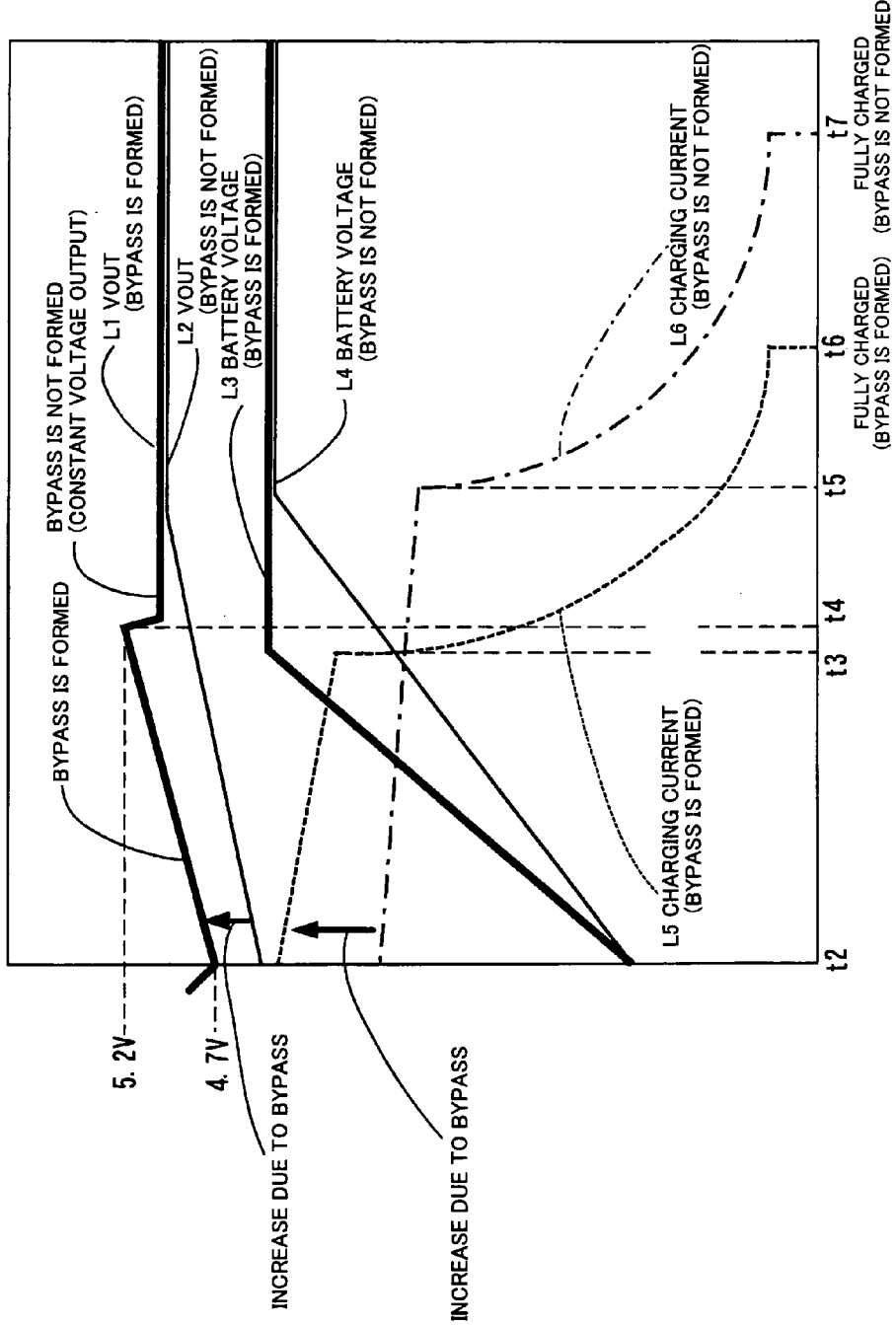
FIG. 7 is a view showing an example of secondary battery charging characteristics using a circuit shown in FIG. 3.

FIG. 7 is a view showing an example of secondary battery charging characteristics using the circuit shown in FIG. 3. In FIG. 7, the horizontal axis indicates elapsed time, and the vertical axis indicates a voltage value or a current value.

In FIG. 7, a characteristic line L1 indicates a change in the output voltage (Vout) of the power supply control section 48 shown in FIG. 2 when the LOD 49 is bypassed, and a characteristic line L2 indicates a change in the output voltage (Vout) when the LDO 49 is not bypassed.

A characteristic line L3 indicates a change in the battery voltage (positive electrode voltage) of the secondary battery 94 when the LDO 49 is bypassed, and a characteristic line L4 indicates a change in the battery voltage (positive electrode voltage) of the secondary battery 94 when the LDO 49 is not bypassed.

A characteristic line L5 indicates a change in the charging current of the secondary battery 94 when the LDO 49 is bypassed, and a characteristic line L6 indicates a change in the charging current of the secondary battery 94 when the LDO 49 is not bypassed.

The characteristic line L1 is discussed below. The LDO 49 is bypassed (bypass is turned ON) in a period from time t2 to time t4. In this case, since power is supplied to the load 90 through a low-impedance FET (PMOS transistor M1), the output voltage (Vout) of the power supply section 48 increases stepwise as compared with the voltage (characteristic line L2) when the LDO 49 is not bypassed. In FIG. 7, an arrow provided between the characteristic lines L1 and L2 indicates an increase in voltage due to the bypass. When the bypass of the LDO 49 is canceled (bypass is turned OFF) at time t4, the output voltage (Vout) of the power supply section 48 decreases to some extent, and is then maintained at a constant voltage.

Comparison between the characteristic lines L3 and L4 shows that a constant voltage mode is reached earlier according to the characteristic line L3 when the LDO 49 is bypassed as compared with the characteristic line L4 in the same manner as the characteristic lines L1 and L2.

The characteristic lines L5 and L6 are discussed below. When the LDO 49 is bypassed (characteristic line L5), a constant current mode (CC mode) ends at time t3, and the secondary battery 94 is fully charged at time t6. When the LDO 49 is not bypassed (characteristic line L6), a constant current mode (CC mode) ends at time t5, and the secondary battery 94 is fully charged at time t7. Specifically, the period of time required for the secondary battery 94 to be fully charged can be significantly reduced by bypassing the LDO 49.

The charging efficiency of a secondary battery when using non-contact power transmission is lower than the charging efficiency when using a normal charger (charger using an AC adaptor) so that the charging time tends to increase, as described above. Therefore, it is important to reduce the charging time. According to the invention, the charging time can be significantly reduced by a simple configuration.

For example, a large amount of charging current flows through a portable terminal (including a portable telephone terminal, PDA terminal, and portable personal computer terminal) under heavy load so that heat generation tends to occur to a large extent. According to the invention, since low loss and low heat generation characteristics can be implemented, the user can utilize an electronic instrument such as a portable terminal without worry.

Second Embodiment

In this embodiment, power supply to the LDO 49 is suspended (turned OFF) when bypassing the LDO 49 to suppress unnecessary power consumption and heat generation.

According to the above-described embodiment, even when the LDO 49 is bypassed under heavy load or the like, the LDO 49 keeps consuming power so that heat generation occurs. Therefore, power transmitted from the power transmission device 10 (see FIG. 2) is wasted, whereby power utilization efficiency decreases.

In this embodiment, the LDO 49 is entirely (or partially) set in a non-operating state when bypassing the LDO 49 to further suppress unnecessary power consumption and heat generation. This further improves the power utilization efficiency of the power reception device using non-contact power transmission.

Figure 8:
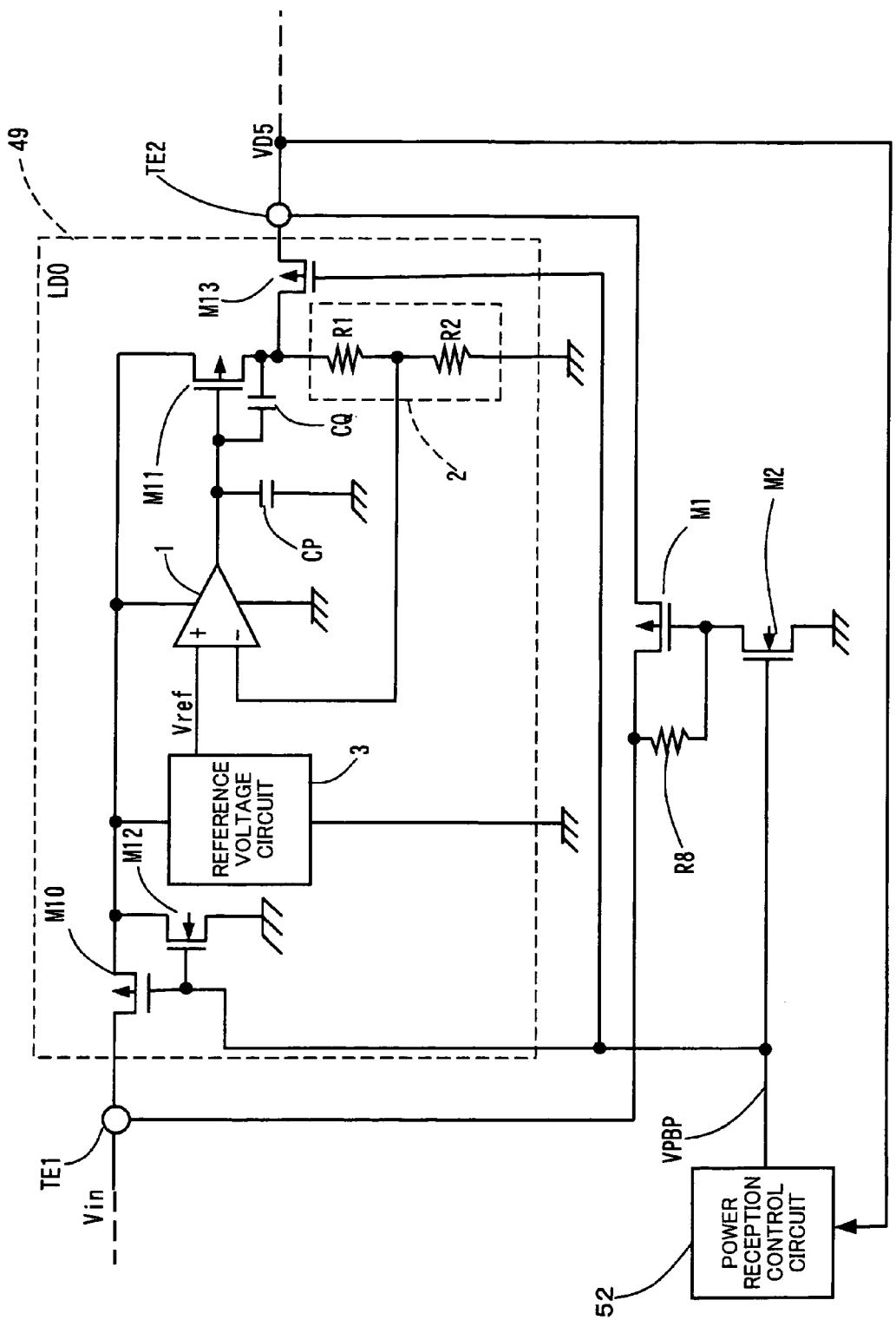
FIG. 8 is a circuit diagram of the main portion of a power reception device showing another example of a power reception device according to the invention (example in which power supply to the LDO is suspended (i.e., the LDO is set in a non-operating state) when bypassing the LDO).

The details are described below. FIG. 8 is a circuit diagram of the main portion of a power reception device showing another example of the power reception device according to the invention (example in which power supply to the LDO is suspended (i.e., the LDO is set in a non-operating state) when bypassing the LDO). In FIG. 8, the same sections as in the above-mentioned drawings are indicated by the same reference symbols.

The LDO (regulator) 49 shown in FIG. 8 includes a PMOS transistor (M10) which functions as a power supply disconnection switch, a pull-down element (NMOS transistor) M12 which sets the power supply line of the LDO 49 at a ground potential when the power supply has been disconnected, an isolation element (PMOS transistor) M13 which isolates the LDO 49 from the load 90 when the power supply voltage has been disconnected, a reference voltage circuit 3, a voltage comparator (operational amplifier) 1, a smoothing capacitor (CP), an NMOS transistor (M11), a capacitor (CQ) connected between the gate and the source of the NMOS transistor (M11), and a voltage divider circuit 2 (including voltage divider resistors R1 and R2). The voltage obtained by the voltage divider circuit 2 is input to a non-inverting terminal of the voltage comparator (operational amplifier) 1.

The reference voltage circuit 3 generates a reference voltage (Vref) based on the input voltage (Vin), and supplies the reference voltage (Vref) to a non-inverting terminal of the voltage comparator (operational amplifier) 1. The voltage comparator (operational amplifier) 1 controls the gate voltage of the NMOS transistor (M11) so that the voltage of the non-inverting terminal becomes equal to the reference voltage (Vref).

Specifically, the output voltage (VD5) of the LDO is set at Vref·(R1/R1+R2) so that a constant low voltage is output when a sufficient amount of power is supplied from the power transmission device.

The power reception control circuit 52 included in the power reception control device 50 monitors the output voltage (VD5) of the LDO 49 in the same manner as in the above embodiment. The power reception control circuit 52 generates the switch control signal (VPBP) which controls whether or not to forms a bypass path based on the output voltage (VD5), and ON/OFF-controls the NMOS transistor (M2) as the bypass control circuit using the switch control signal (VPBP).

The PMOS transistor (M1) as the bypass circuit is connected between the input terminal (TE1) and the output terminal (TE2) of the LDO.

When the NMOS transistor (M2) is turned ON, the PMOS transistor (M1) as the bypass switch circuit is turned ON so that a path which bypasses the LDO 49 is formed. Since the PMOS transistor (M1) is turned OFF when the NMOS transistor (M2) is turned OFF, the bypass path is not formed.

According to this embodiment, the PMOS transistor M10 is inserted into the power supply line (line which transmits the input voltage Vin) of the LDO 49, and power supply to the LDO 49 is disconnected by causing the PMOS transistor M10 to be turned OFF. When power supply is disconnected, the pull-down element (M12) is turned ON and the power supply line is set at a ground potential, whereby the entire LDO 49 is set in a non-operating state. When power supply is disconnected, the isolation element (M13) is turned OFF, whereby the LDO 49 is isolated from the load 90. Moreover, the above control is performed utilizing the switch control signal (VPBP).

When the bypass switch control signal (VPBP) has become active (high level) so that the NMOS transistor (M2) as the bypass control circuit has been turned ON, the PMOS transistors (M10 and M13) provided in the LDO 49 are turned OFF, and the NMOS transistor M12 as the pull-down element is turned ON. Therefore, the LDO 49 is set in a non-operating state.

This eliminates unnecessary power consumption and heat generation of the LDO 49, whereby the power utilization efficiency of the power reception device using non-contact power transmission is further improved.

The non-operating state/operating state of the LDO 49 can be switched merely by adding a simple switching element (e.g., PMOS transistor M10 shown in FIG. 8). This facilitates implementation of the switching operation without increasing the number of elements.

Moreover, the switching element (PMOS transistor M10 shown in FIG. 8) can be ON/OFF-controlled utilizing the bypass control signal (VPBP). Specifically, since the bypass switch circuit (PMOS transistor M1) can be ON/OFF-controlled and the non-operating state/operating state of the LDO (regulator) 49 can be controlled using the switch control signal (VPBP), it is unnecessary to generate a special control signal. Therefore, the control system does not become complicated.

In the above-described example, the entire LDO 49 (all elements) is set in a non-operating state when bypassing the LDO 49. Note that only some of the elements may be set in a non-operating state. For example, when the operation of the regulator is adversely affected by setting all of the elements of the regulator (e.g., when a delay occurs when causing the regulator to operate), only some of the elements which affect the operation of the regulator to only a small extent may be set in a non-operating state. This also reduces the power consumption and heat generation of the regulator.

According to this embodiment, the capability of the power reception device using non-contact power transmission to supply power to the load can be effectively improved while minimizing loss of the received power. Moreover, a problem relating to heat generation of the regulator can be eliminated.

Figure 9:
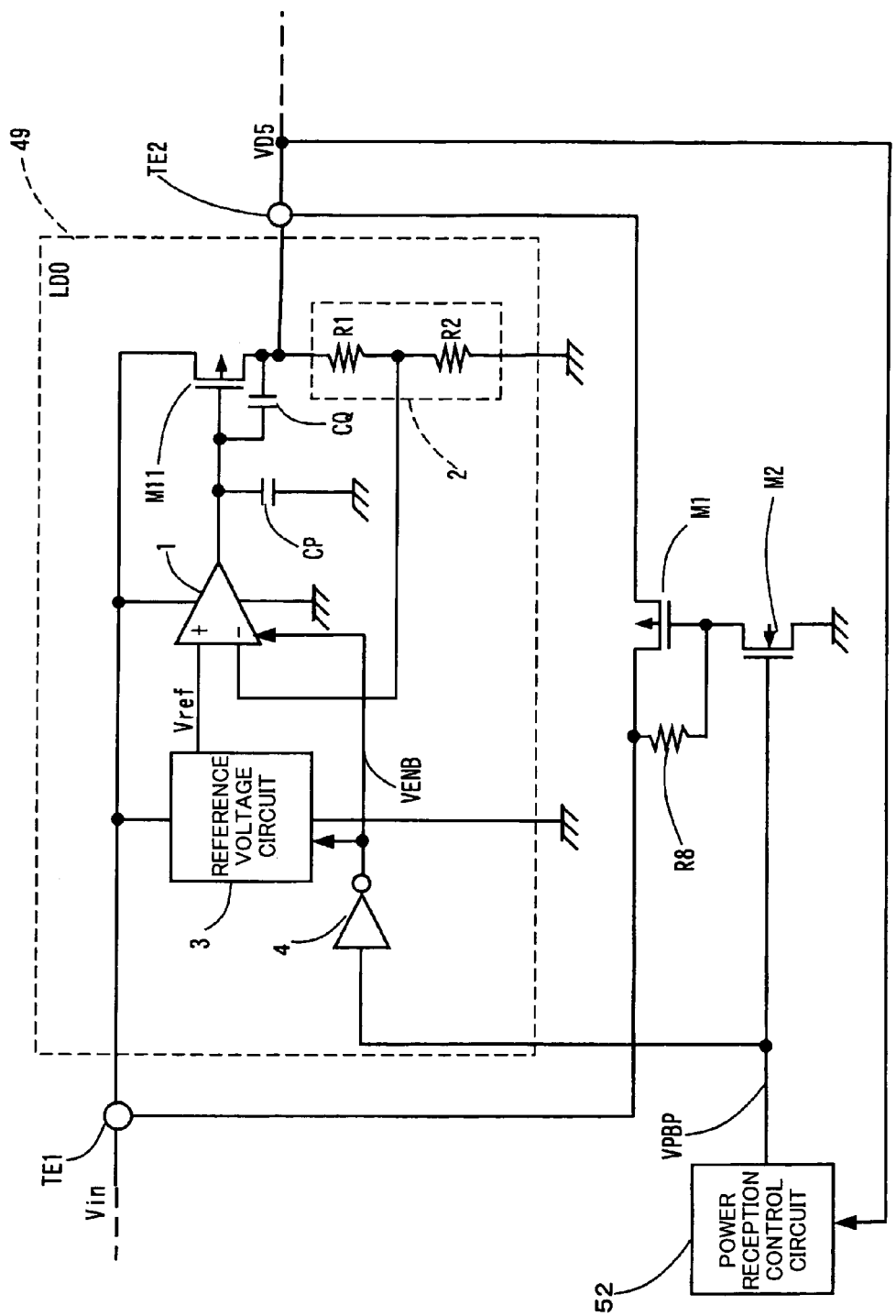
FIG. 9 is a circuit diagram of the main portion of a power reception device showing a further example of the circuit configuration of a power reception device according to the invention (example in which the LDO is set in a non-operating state by disabling the LDO when bypassing the LDO).

FIG. 9 is a circuit diagram of the main portion of a power reception device showing a further example of the power reception device according to the invention (example in which the LDO is set in a non-operating state by disabling the elements of the LDO when bypassing the LDO).

A function implemented by the circuit shown in FIG. 9 is the same as that of the circuit shown in FIG. 8. In FIG. 9, the reference voltage circuit 3 and the voltage 10 comparator 1 are configured as circuit elements with an enable terminal. The bypass switch control signal (VPBP) is reversed using an inverter 4 to generate an active-high enable signal (VENB). The reference voltage circuit 3 and the voltage comparator 1 normally operate when the enable signal VENB is set at the high level, and are disabled when the enable signal VENB is set at the low level.

Since the switch control signal (VPBP) is set at the high level when forming the bypass path, the enable signal (VENB) is set at the low level. Therefore, the reference voltage circuit 3 and the voltage comparator 1 are disabled and do not consume power. The voltage comparator 1 has a function of setting the gate and the source of the PMOS transistor (M11) at the same potential when the voltage comparator 1 is disabled. The PMOS transistor (M11) of which the gate and the source are set at the same potential is turned OFF, whereby the LDO 49 is isolated from the load (50). In FIG. 9, the isolation element (PMOS transistor M13) used in FIG. 8 is unnecessary.

According to this embodiment, the capability of the power reception device using non-contact power transmission to supply power to the load can be effectively improved while reasonably minimizing loss of the received power. Moreover, a problem relating to heat generation of the regulator can be eliminated. In the circuit shown in FIG. 9, since a switching element (MOS transistor) is not provided in the power supply path, no loss occurs when supplying power.

According to the embodiments of the invention, the following effects can be obtained, for example. Note that the following effects are not necessarily achieved at the same time. Accordingly, the following effects do not in any way limit the scope of the invention.

(1) A capability of supplying power to the load can be reasonably increased by causing the switch circuit to be turned ON to form a low-loss bypass path when the capability of supplying power to the load has decreased due to a decrease in the voltage at the input terminal (or output terminal) of the regulator, and supplying a current to the load through the bypass path. Moreover, heat generation of the regulator when supplying a large amount of current to the load (i.e., under heavy load) can be suppressed. Since the bypass path is formed only when the voltage at the input terminal (or output terminal) of the regulator has decreased, an excessive voltage is not applied to the load. Therefore, a problem does not occur when bypassing the regulator.

(2) The charging time of a secondary battery can be reasonably reduced while reducing the size of a charger by employing a simple configuration in which a small, low-noise, and low-loss series regulator is bypassed using a low-loss switch circuit under heavy load and using a secondary battery as the load.

(3) A situation in which a bypass path is erroneously formed when the input voltage is sufficiently high can be reliably prevented by ON/OFF-controlling the switch circuit based on the voltage at the input terminal of the regulator.

(4) The switch circuit can be accurately ON/OFF-controlled by monitoring the voltage supplied to the load by ON/OFF-controlling the switch circuit based on the voltage at the output terminal of the regulator. Moreover, the switch circuit can be turned OFF (i.e., path which bypasses the regulator can be disconnected) after checking that the output voltage (voltage supplied to the load) of the regulator has sufficiently recovered (risen). Therefore, the switch circuit can be appropriately OFF-controlled.

(5) A situation in which a bypass path is erroneously formed when the input voltage is sufficiently high can be reliably prevented by ON/OFF-controlling the switch circuit based on the voltage at the input terminal and the voltage at the output terminal of the regulator. Moreover, the switch circuit can be accurately OFF-controlled.

(6) It is possible to prevent malfunction in which the switch circuit is repeatedly turned ON/OFF following a small change in the voltage at the input terminal or the output terminal of the regulator by ON/OFF-controlling the switch circuit with hysteresis characteristics, whereby stable regulator bypass control is implemented.

(7) Unnecessary power consumption and heat generation can be further suppressed by suspending the operation of the regulator when bypassing the regulator by causing the switch circuit to be turned ON, whereby loss of the received power can be minimized. When suspending the operations of all elements of the regulator, the power consumption and heat generation of the regulator can be eliminated. When suspending the operations of some elements of the regulator, the power consumption and heat generation of the regulator can be reduced. Therefore, the capability of the power reception device using non-contact power transmission to supply power to the load can be effectively improved while minimizing loss of the received power. Moreover, a problem relating to heat generation of the regulator can be eliminated.

(8) The configuration of the circuit which ON/OFF-controls the switch circuit can be simplified utilizing the switch control signal which causes the switch circuit to be turned ON/OFF for setting the regulator to be entirely or partially in a non-operating state/operating state.

(9) Power loss and heat generation of a power reception device (device which receives power) using the non-contact power transmission technology can be effectively suppressed by a simple configuration. Therefore, a non-contact power transmission power reception device having excellent characteristics such as a reduced size, low loss, and low heat generation can be implemented. In non-contact power transmission, loss due to power transmission between the induction coils inevitably occurs. Therefore, the power reception device is required to efficiently supply power to the load without unnecessarily consuming the received power due to heat generation and the like. According to the embodiments of the invention, these requirements can be satisfied.

(10) For example, the switch circuit may be formed using a PMOS transistor (low-loss insulated gate field effect transistor), and the bypass control circuit may be formed using an NMOS transistor and a pull-up resistor. According to this configuration, the regulator can be bypassed using a minimum number of elements (i.e., two MOS transistors and one resistor). Implementation is facilitated due to a simple circuit configuration. Moreover, since each MOS transistor operates at high speed, high-speed switching control is possible.

(11) The invention may be applied to various electronic instruments (e.g., watch, cordless telephone, shaver, electric toothbrush, wrist computer, handy terminal, portable information terminal, or power-assisted bicycle). Examples of particularly suitable electronic instruments include a portable terminal (including a portable telephone terminal, PDA terminal, and portable personal computer terminal) and a watch. Since the power reception device according to the invention has a simple configuration and a reduced size, the power reception device can be incorporated in a portable terminal or the like. The charging time of a secondary battery provided in an electronic instrument can be reduced using the power reception device according to the invention due to low loss. Moreover, since the power reception device according to the invention exhibits reduced heat generation, the reliability of an electronic instrument increases from the viewpoint of safety.

(12) Since a large amount of charging current flows through a portable terminal (including portable telephone terminal, PDA terminal, and portable personal computer terminal) under heavy load, heat generation tends to occur to a large extent. A highly reliable portable terminal with reduced loss and heat generation is implemented by applying the invention to a portable terminal.

(13) According to some embodiments of the invention, power loss and heat generation of a power reception device (device which receives power) utilizing the non-contact power transmission technology can be effectively reduced by a simple configuration.

Although the embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., AC adaptor, GND, and portable telephone/charger) cited with a different term (e.g., external power supply device, low-potential-side power supply, and electronic instrument) having a broader meaning or the same meaning at least once in the specification and the drawings can be replaced by the different term in any place in the specification and the drawings. The invention also includes any combination of the embodiments and the modifications (variations). The configurations and the operations of the power reception control device and other control circuits, the power transmission method when connection of an AC adaptor has been detected, and the like are not limited to those described relating to the above embodiments. Various modifications and variations may be made.

The configuration of the switch circuit which bypasses the regulator (LDO) and the configuration of the bypass control circuit which causes the switch circuit to be turned ON/OFF may be appropriately selected. For example, a high-performance circuit including a plurality of semiconductor elements may be used. It is also possible to detect the temperature around the regulator, and cause the bypass path to be formed when a high temperature has been reached to reduce heat generation of the regulator.

Some embodiments of the invention can effectively reduce power loss and heat generation of a power reception device (device which receives power) utilizing the non-contact power transmission technology by a simple configuration. Therefore, the invention is useful for a power reception control device (power reception control LSI), a power reception device (power reception IC module), an electronic instrument (e.g., portable terminal), and the like utilizing non-contact power transmission.

What is claimed is:

1. A power reception control device provided in a power reception device of a non-contact power transmission system, the non-contact power transmission system transmitting power from a power transmission device to the power reception device that includes a rectifier circuit and a regulator by electromagnetically coupling a primary coil and a secondary coil, the non-contact power transmission system transmitting an output voltage of the rectifier to the regulator, the regulator transmitting an output voltage of the regulator to a load from a voltage output node of the power reception device, the power reception control device comprising:

a power reception control circuit that monitors at least one of a voltage at an input terminal and a voltage at an output terminal of the regulator provided in the power reception device, and, when a capability of supplying power to the load has decreased due to a decrease in at least one of the voltage at the input terminal and the voltage at the output terminal, the power reception control circuit causing a switch circuit provided between the input terminal and the output terminal of the regulator to be turned ON, upon turn on of the switch circuit, the switch circuit forms a bypass path that directly connects the input terminal and the output terminal of the regulator, the output voltage of the rectifier circuit being transmitted to the load through the bypass path.

2. The power reception control device as defined in claim 1, the regulator being a series regulator that functions as a power supply circuit; and the load including a secondary battery.

3. The power reception control device as defined in claim 1, the power reception control circuit causing the switch circuit to be turned ON or OFF based on the voltage at the input terminal of the regulator.

4. The power reception control device as defined in claim 1, the power reception control circuit causing the switch circuit to be turned ON or OFF based on the voltage at the output terminal of the regulator.

5. The power reception control device as defined in claim 1, the power reception control circuit causing the switch circuit to be turned ON based on the voltage at the input terminal of the regulator, and causing the switch circuit to be turned OFF based on the voltage at the input terminal of the regulator.

6. The power reception control device as defined in claim 1, a second threshold voltage that causes the switch circuit to be turned OFF being set to be higher than a first threshold voltage that causes the switch circuit to be turned ON.

7. The power reception control device as defined in claim 6, the power reception control device further including a switch control signal generation circuit that generates a switch control signal that causes the switch circuit to be turned ON/OFF, the switch control signal generation circuit including:

a first voltage divider resistor, a second voltage divider resistor, and a third voltage divider resistor that divide the voltage at the output terminal of the regulator;

a first hysteresis comparator, a voltage at a common connection point of the first voltage divider resistor and the second voltage divider resistor being applied to an inverting terminal of the first hysteresis comparator, and a reference voltage being applied to a non-inverting terminal of the first hysteresis comparator;

a second hysteresis comparator, a voltage at a common connection point of the second voltage divider resistor and the third voltage divider resistor being applied to an inverting terminal of the second hysteresis comparator, and the reference voltage being applied to a non-inverting terminal of the second hysteresis comparator; and an RS flip-flop that is set based on a positive edge or a negative edge of an output voltage of the first hysteresis comparator, is reset based on a positive edge or a negative edge of an output voltage of the second hysteresis comparator, and outputs the switch control signal from its output terminal.

8. The power reception control device as defined in claim 1, the power reception control circuit causing the switch circuit to be turned ON to form the bypass path while setting the entirety or part of the regulator in a non-operating state.

9. The power reception control device as defined in claim 8, the non-operating state/operating state of the entirety or part of the regulator being controlled based on a switch control signal that causes the switch circuit to be turned ON/OFF.

10. A power reception device comprising:

the power reception control device as defined in claim 1;

a power reception section that includes the rectifier circuit and converts an induced voltage in the secondary coil into a direct-current voltage; and a power supply control section that includes the regulator and the switch circuit that is provided between the input terminal and the output terminal of the regulator, and controls power supply to the load.

11. The power reception device as defined in claim 10, the power reception device further including a bypass control circuit that is used to control the switch circuit to be turned ON/OFF, the power reception control circuit controlling the switch circuit to be turned ON/OFF by controlling an operation of the bypass control circuit.

12. The power reception device as defined in claim 11, the switch circuit including a PMOS transistor, a source and a drain of the PMOS transistor being respectively connected to the input terminal and the output terminal of the regulator; and the bypass control circuit including:

an NMOS transistor, a source of the NMOS transistor being grounded and a drain of the NMOS transistor being connected to a gate of the PMOS transistor; and a pull-up resistor that is connected between the gate of the PMOS transistor and the input terminal of the regulator.

13. An electronic instrument comprising:

the power reception device as defined in claim 10; and a load, power being supplied to the load from the power reception device.

14. The electronic instrument as defined in claim 13, the electronic instrument being a portable terminal.

15. The power reception control device according to claim 1, wherein when the switch circuit is turned ON, the output voltage of the rectifier is transmitted directly to the load.

* * * * *